United States Patent
Kelsay et al.

(10) Patent No.: US 6,873,453 B2
(45) Date of Patent: Mar. 29, 2005

(54) LASER REFRACTION SYSTEM

(75) Inventors: Curtis G. Kelsay, Boise, ID (US);
Bruce J. Jackson, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/406,881

(22) Filed: Apr. 4, 2003

(65) Prior Publication Data

US 2004/0196528 A1 Oct. 7, 2004

(51) Int. Cl.⁷ .............................. G02B 26/08; G02F 1/29
(52) U.S. Cl. ...................... 359/298; 359/299; 359/239
(58) Field of Search .............................. 359/239, 298, 359/299, 322, 534, 542, 639

(56) References Cited

U.S. PATENT DOCUMENTS

| | | | |
|---|---|---|---|
| 4,001,840 A | * | 1/1977 | Becker et al. ............... 347/259 |
| 4,106,844 A | * | 8/1978 | Bryngdahl et al. ........... 359/17 |
| 4,279,472 A | * | 7/1981 | Street ........................ 250/201.1 |
| 4,508,431 A | | 4/1985 | Henshaw ..................... 359/299 |
| 4,966,443 A | * | 10/1990 | Hiiro .......................... 359/299 |
| 5,493,326 A | | 2/1996 | Andrews et al. ............. 347/257 |
| 5,557,448 A | * | 9/1996 | Endo et al. .................. 359/208 |
| 5,652,611 A | | 7/1997 | Nakashima et al. ......... 347/206 |
| 6,414,763 B1 | | 7/2002 | Hesselink et al. ........... 359/821 |
| 6,473,246 B1 | | 10/2002 | Chao ........................... 359/813 |

FOREIGN PATENT DOCUMENTS

| | | |
|---|---|---|
| JP | 57204569 | 12/1982 |
| JP | 03194568 | 8/1991 |
| JP | 2003098427 | 4/2003 |

OTHER PUBLICATIONS

International Search Report dated Sep. 7, 2004.

* cited by examiner

*Primary Examiner*—Georgia Epps
*Assistant Examiner*—M. Hasan

(57) ABSTRACT

In one embodiment, a laser refraction system includes a refracting unit to refract light emitted from a laser. A refracting unit control procedure configures a charge on an OPC according to an image by sending a signal to the refracting unit to control refraction degree and timing.

47 Claims, 4 Drawing Sheets

LASER REFRACTION SYSTEM

BACKGROUND

In an imaging device—such as a printer, multifunctional peripheral, fax machine, network copier, copy machine or similar device—light may be used to discharge (or possibly charge) the OPC (optical photo conductor, e.g. the "drum") in manner consistent with an image to be printed. In a first configuration, a laser is directed at a spinning mirror having a plurality of reflective surfaces. The reflected light strikes the OPC, thereby providing a charge consistent with the image to be printed.

A second configuration, involves the association of an LED diode with each pixel location on a raster line of the OPC. Thousands of diodes are used to illuminate the thousands of pixels present on each raster line of an image. Aspects of both the first configuration and the second configuration make them relatively expensive to use in an imaging device.

SUMMARY

In one embodiment, a laser refraction system includes a refracting unit to refract light emitted from a laser. A refracting unit control procedure configures a charge on an OPC according to an image by sending a signal to the refracting unit to control refraction degree and timing.

BRIEF DESCRIPTION OF THE DRAWINGS

The same reference numbers are used throughout the drawings to reference like features and components.

DETAILED DESCRIPTION

Figure 1:
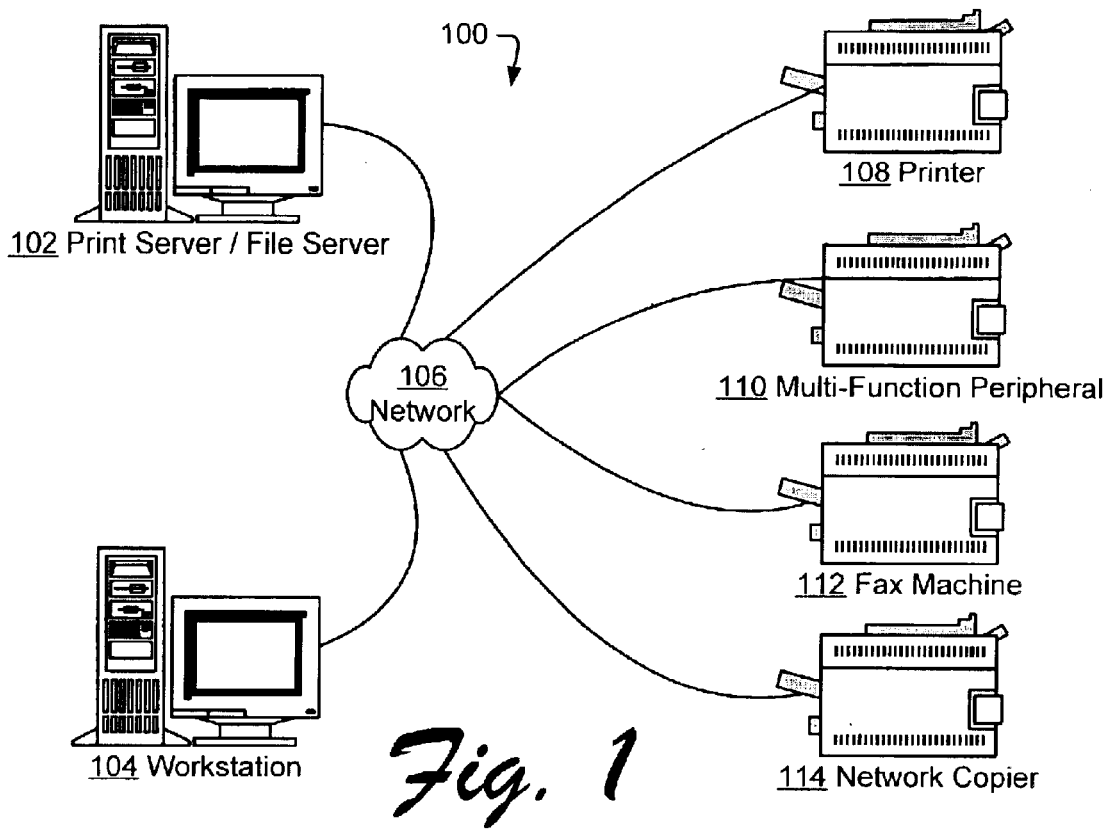
FIG. 1 is an exemplary illustration of a plurality of imaging devices suitable for implementation of a laser refraction system.

FIG. 1 shows an example of a plurality of imaging devices suitable for implementation of a laser refraction system. Within an exemplary network environment 100 a printer server 102 supports a workstation 104 over a network 106. Exemplary imaging devices 108–114 suitable for implementation of a laser refraction system include a printer 108, a multifunction peripheral 110, a fax machine 112 and a copy machine, such as network copier 114.

Figure 2A:
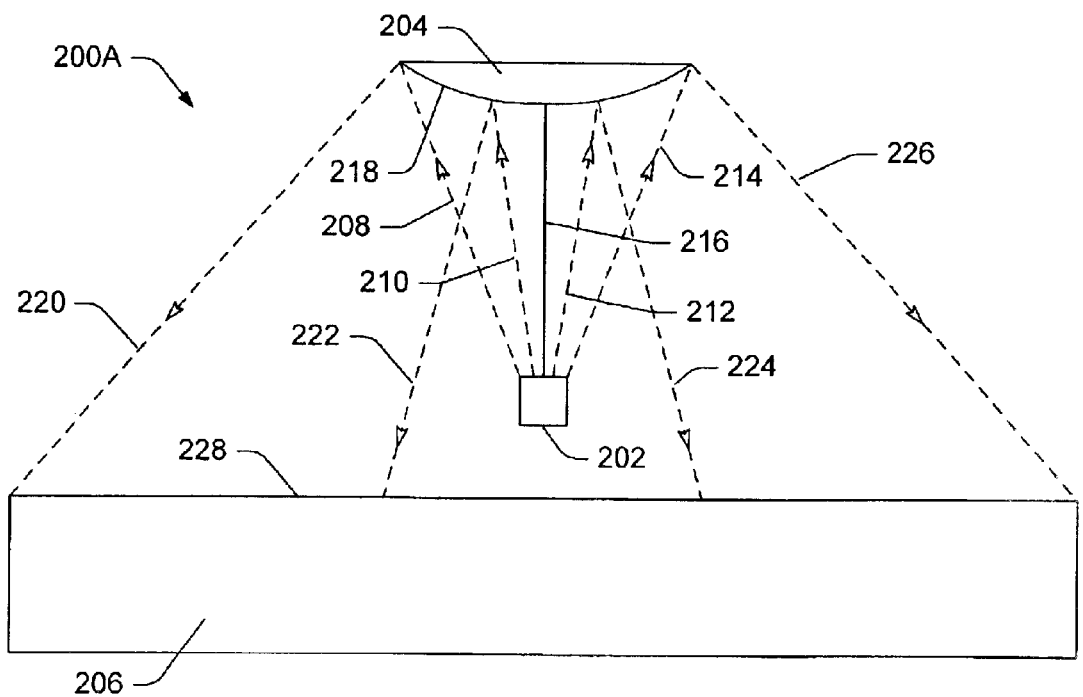
FIG. 2A is a diagram illustrating a first exemplary implementation of an imaging system, including a laser refracting unit, a mirror and an OPC.

FIG. 2A is a diagram illustrating an exemplary implementation of an imaging system 200A to refract laser light for reflection on one or more stationary mirrors and to selectively charge or discharge locations on the surface of an OPC consistent with production of an image. The imaging system 200A includes a laser and laser refracting unit 202, a mirror 204 and an OPC 206. The laser-refracting unit 202 is adapted for production of laser pulses 208–214 which may be refracted from their original course, along the centerline 216 by the refracting unit 202.

The laser pulses 208–214 are reflected off one or more mirrors, such as the curved surface 218 of the stationary mirror 204. The curved surface 218 may be convex, as illustrated, or an alternate configuration oriented to allow reflected laser pulses 220–226 to strike a desired location on the surface 228 of the OPC 206. Additional mirrors may be used in addition to stationary mirror 204, typically located and configured to reduce the overall size of the imaging system.

Figure 2B:
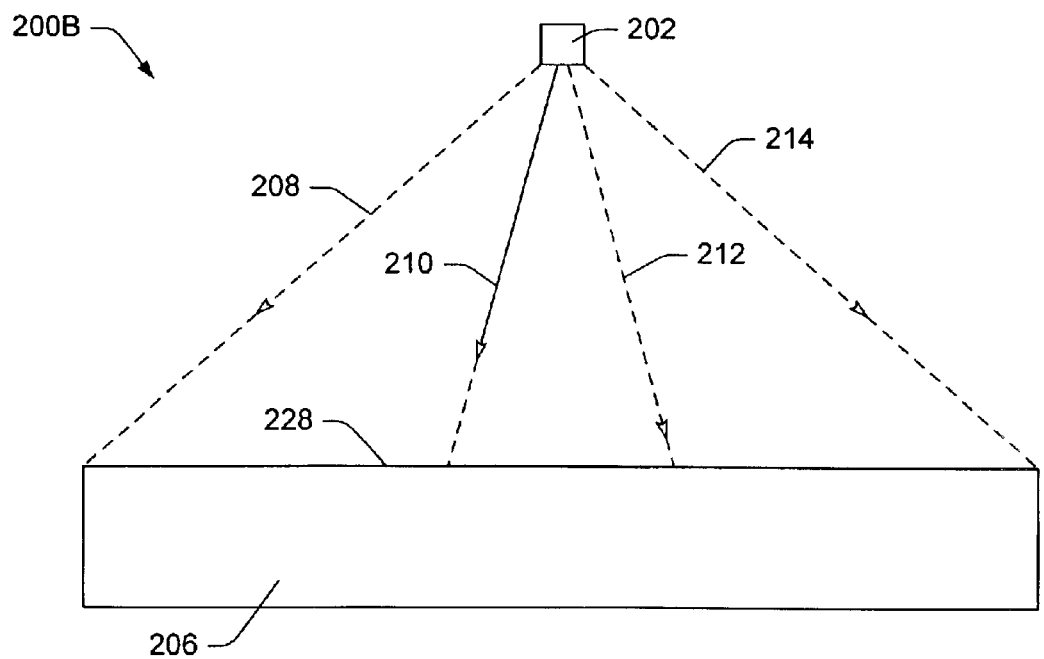
FIG. 2B is a diagram illustrating a second exemplary implementation of an imaging system, including a laser refracting unit and an OPC.

FIG. 2B is a diagram illustrating a second exemplary implementation of an imaging system 200B to refract laser light to selectively discharge locations on an OPC consistent with production of an image. The imaging system 200B includes a laser and laser refracting unit 202 and an OPC 206. Laser pulses 208, 210, 212 and 214 are exemplary of laser pulses which travel directly from the laser refracting unit 202 to the surface 228 of the OPC 206 without reflection.

Figure 3:
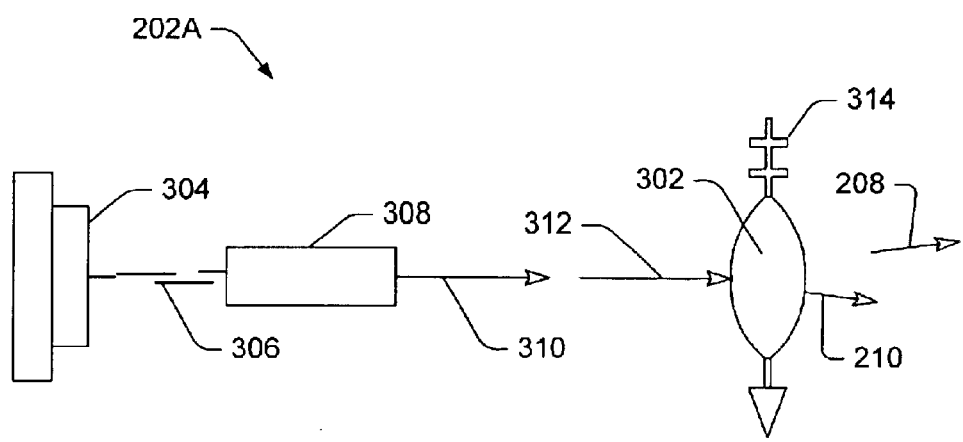
FIG. 3 is a diagram illustrating a first exemplary refracting unit based on a photorefractive crystal.

FIG. 3 is a diagram illustrating an exemplary laser and laser refracting unit 202A based on a photorefractive crystal 302. A laser unit 304 emits laser light 306 that is organized by columnating lens 308, resulting in columnated pulses of laser light 310, 312. As will be seen, pulse data may be used to control the operation of the laser unit 304, and to therefore control the duration and timing of laser pulses 310, 312. The focused laser pulses 310, 312 enter the photorefractive lens 302, where they are refracted by a selected angle at a selected time. For example, an earlier laser pulse 312 is refracted by a different angle than a later laser pulse 310. Thus, the photorefractive crystal refracts the incoming laser light 312, 310 to produce laser pulses 208, 210 having different degrees of refraction and timing.

An e-field receptor 314 controls the operation of the photorefractive crystal 302. Accordingly, by varying an e-field, the degree to which the photorefractive crystal 302 refracts the in-coming laser pulses 310, 312—and the timing of that refraction—can be precisely controlled.

Figure 4:
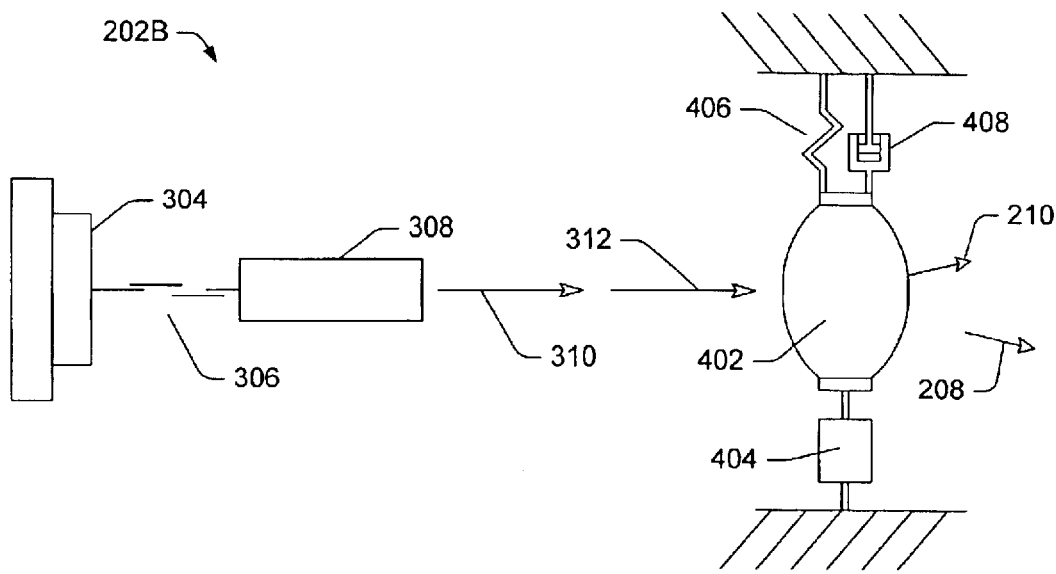
FIG. 4 is a diagram illustrating a second exemplary refracting unit based on a lens moved by a servo system.

FIG. 4 is a diagram illustrating a second exemplary laser and laser refracting unit 202B. The second exemplary laser and laser refracting unit 202B differs from the first exemplary laser-refracting unit 202A in that a movable lens 402 replaces the photorefractive crystal 302. The movable lens is moved to a desired orientation—at a desired time—to refract laser light to a desired location on the OPC. In the implementation of FIG. 4, the movable lens 402 rotates to refract light by different angles. Movement of the lens 402 may be controlled by a servo system 404, spring 406 and damper 408. Alternatively, other means can be substituted to move the lens 402 as desired. Movement of the lens results in refraction of laser pulses 312, 310 to produce refracted laser pulses 208, 210.

Figure 5:
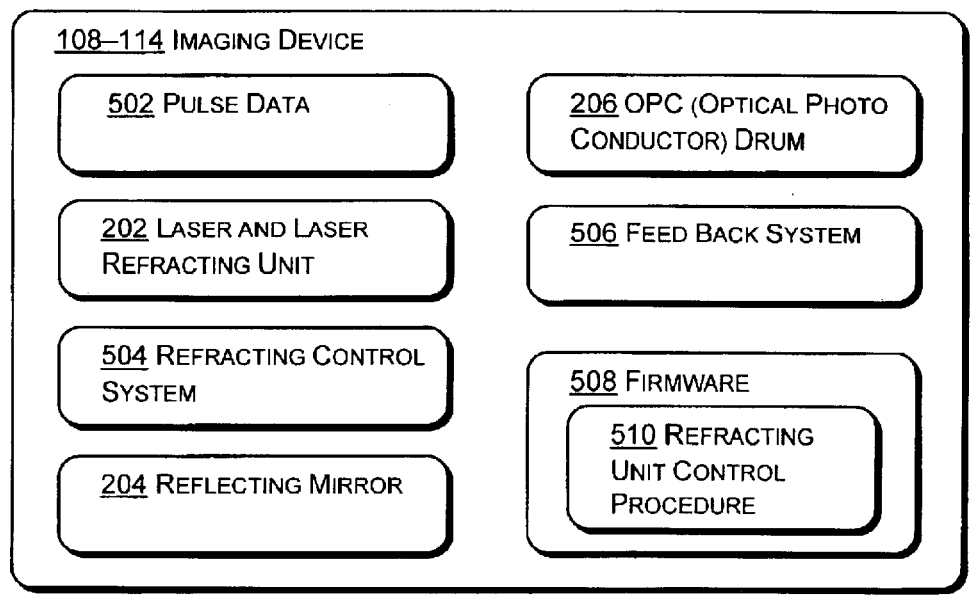
FIG. 5 is a block diagram illustrating exemplary hardware and software components within an imaging device having a laser refracting system.

FIG. 5 is a block diagram illustrating exemplary hardware and software components within an imaging device 108–114 having a laser refracting system. The imaging device 108–114 generates pulse data 502. The pulse data 502 is typically formed by interpretation of the commands of page description language (e.g. PostScript) associated with an in-coming print job. A laser and laser refracting unit 202 includes a laser 304 and associated columnating lenses 308, and is configured to receive the pulse data and to generate laser pulses 208–214. The refracting unit 202 may be configured as seen in FIG. 3, based on a photorefractive crystal 302, or may be configured as seen in FIG. 4, based on a lens 402 moved according to a servo system 404 spring 406 and damper 408. A refracting unit control system 504 controls either the appropriate e-field receptor 314 of the refracting unit 202A of FIG. 3 or the servo system 404 and spring damper 406 of the refracting unit 202B of FIG. 4.

Optionally, one or more reflecting mirrors 204 may be stationary, and may include a curved reflective surface 218, which is typically convex or various planar surfaces. The reflective mirrors may be configured to reflect laser pulses 208–214 onto any location on the surface 228 of the OPC 206.

A feedback assembly 506 compares the actual angle by which pulses 208–214 travel with the expected angle by which the pulses travel. Where these angles are different, the feedback assembly provides input to the refracting unit control procedure 510, allowing corrections to be made to the inputs to the refracting control system 504. These corrections reduce or eliminate differences between the expected and actual angles of travel of the pulses 208–214.

Firmware 508 within the imaging device 108–114 includes a refracting unit control procedure 510 configured to emit signals appropriate to control the laser refracting unit 202. Accordingly, an implementation of the refracting unit control procedure 510 includes software, firmware or hardware configured to make the calculations required by the refraction control system 504. Such instructions allow the refraction control system 504 to control the operation of the photorefractive crystal 302 or the servo system 404 controlling movement of the lens 402.

Figure 6:
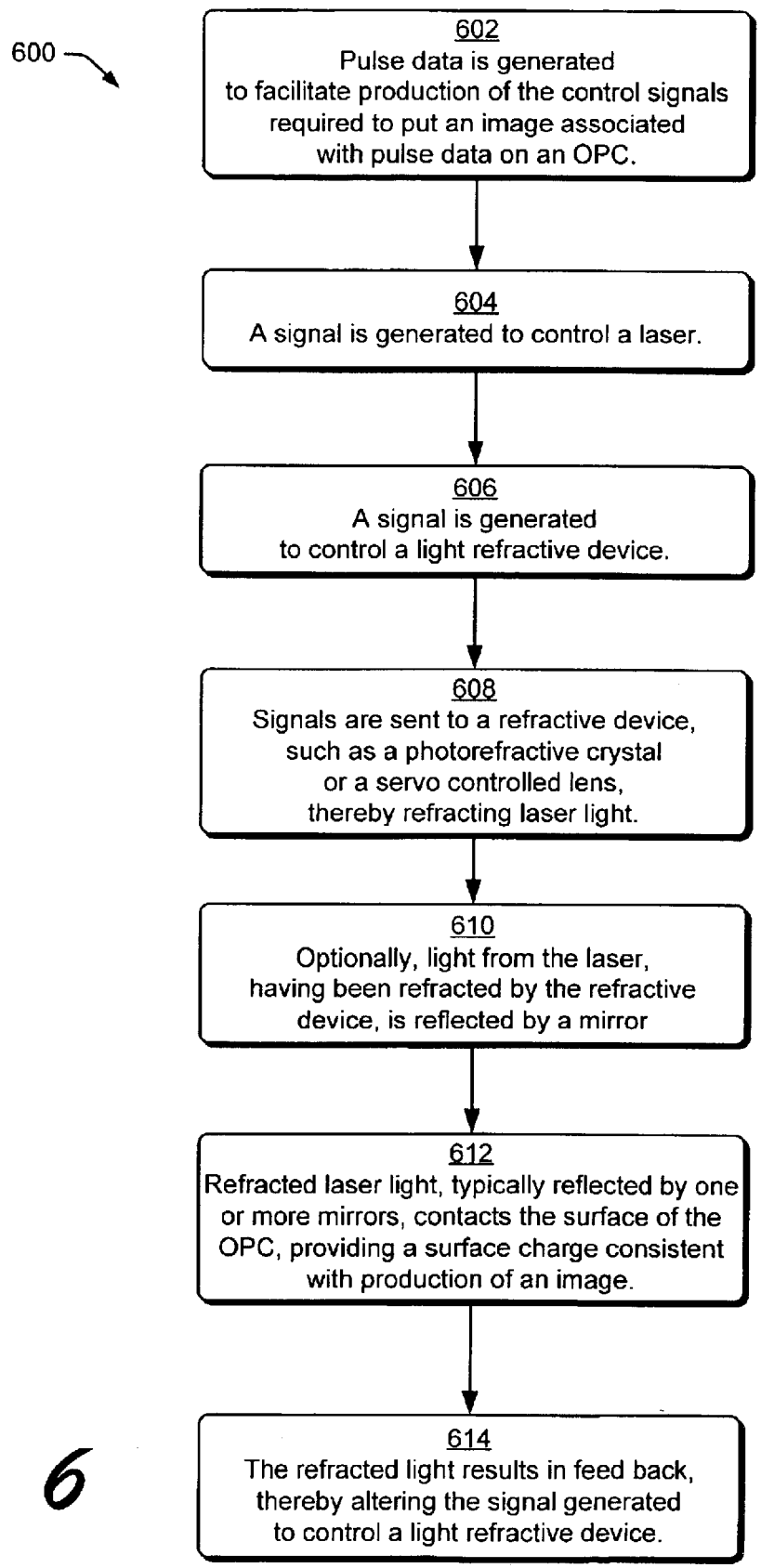
FIG. 6 is a flow diagram that describes an exemplary method to refract laser light and configure an OPC to output an image.

The flow chart of FIG. 6 illustrates a further exemplary implementation, wherein a method 600 is employed to refract laser light within an imaging device 108–114. The elements of the method may be performed by any desired means, such as by the execution of processor-readable instructions defined on a processor-readable media, such as a disk, a ROM or other memory device or by operation of an application specific integrated circuit (ASIC) or other hardware device. Additionally, the elements of the method may be performed by the movement or response of mechanical or solid state parts initiated and controlled through the execution of processor-readable instructions defined on a processor-readable media, such as a disk, a ROM or other memory device. In one embodiment, the ROM may contain firmware 508 implementing the refracting unit control procedure module 510 of FIG. 5. In an alternative embodiment, an ASIC may contain logic that implements similar modules. The actions described in any block may be performed in parallel with actions described in other blocks, may occur in an alternate order, or may be distributed in a manner that associates actions with more than one other block.

At block 602, pulse data is generated to facilitate production of the control signals required to put an image associated with the pulse data on an OPC 206. In an exemplary environment, a print job defined by page description language statements is received by an imaging device 108–114. The page description language statements are interpreted to produce pulse data 502. At block 604, the pulse data is also used to create a signal to turn on and off laser 304, thereby creating laser pulses 310, 312. At block 606, the pulse data is used as input in a process which generates a signal to control a light refractive device 202. This may include signals to create the e-field required to operate the photorefractive crystal 302 of FIG. 3 or may include signals to the servo 404 controlling the lens 402 of FIG. 4.

At block 608, signals are sent to a refractive device 202, including a photorefractive crystal 302 or a servo controlled lens 402, thereby refracting laser pulses 310, 312. Optionally, at block 610, refracted laser pulses 208–214 are reflected by one or more mirrors, such as stationary mirror 204. The one or more mirrors may have a curved surface 218 or a planar surface, as determined by the application.

At block 612, refracted laser light, typically reflected by one or more mirrors, contacts the surface of the OPC, thereby altering a surface charge on the OPC consistent with production of the desired image.

At block 614, the feedback assembly 506 compares the actual and expected angles of travel of the laser pulses 208–214 and determines if correction is to be performed. If correction is to be performed, the refracting unit control procedure 510 provides corrected data to the refracting control system 504, allowing improved instructions to be sent to the refracting unit 202.

Although the disclosure has been described in language specific to structural features and/or methodological steps, it is to be understood that the appended claims are not limited to the specific features or steps described. Rather, the specific features and steps are exemplary forms of implementing this disclosure.

What is claimed is:

1. A laser refraction system, comprising:
   a refracting unit to refract light emitted from a laser;
   a refracting unit control procedure to send a signal to the refracting unit to control refraction degree and timing to configure a charge on an OPC according to an image; and
   wherein the referred light travels from the laser to a surface of the OPC without reflection.

2. The laser refraction system of claim 1, additionally comprising:
   a feedback system to alter the signal sent to the refracting unit in response to the refracted light.

3. The laser refraction system of claim 1, wherein the refracting unit control procedure produces the signal according to pulse data associated with the image.

4. A laser refraction system, comprising:
   a refracting unit to refract light emitted from a laser;
   a refracting unit control procedure to send a signal to the refracting unit to control refraction degree and timing to configure a charge on an OPC according to an image; and
   wherein the refracting unit comprises a photorefractive crystal.

5. The laser refraction system of claim 4, additionally comprising:
   a stationary reflecting mirror to reflect the refracted light onto the OPC.

6. The laser refraction system of claim 4, additionally comprising:
   a feedback system to alter the signal sent to the refracting unit in response to the refracted light.

7. The laser refraction system of claim 4, wherein the refracting unit control procedure produces the signal according to pulse data associated with the image.

8. A laser refraction system, comprising:
   a refracting unit to refract light emitted from a laser;
   a refracting unit control procedure to send a signal to the refracting unit to control refraction degree and timing to configure a charge on an OPC according to an image; and wherein the refracting unit comprises a lens moved by a servo system.

9. The laser refraction system of claim 8, additionally comprising:
a stationary reflecting mirror to reflect the refracted light onto the OPC.

10. The laser refraction system of claim 8, additionally comprising:
a feedback system to alter the signal sent to the refracting unit in response to the refracted light.

11. The laser refraction system of claim 8, wherein the refracting unit control procedure produces the signal according to pulse data associated with the image.

12. An imaging device, comprising:
a laser;
a refracting unit to refract light emitted from the laser;
a refracting unit control procedure to send a signal to the refracting unit to control refraction degree and timing;
an OPC to hold a charge for alteration by the laser; and
wherein the refracted light travels from the laser to a surface of the OPC without reflection.

13. The imaging device of claim 12, additionally comprising:
a feedback system to alter the signal sent to the refracting unit in response to the refracted light.

14. The imaging device of claim 12, wherein the refracting unit control procedure produces the signal according to pulse data associated with an image.

15. An imaging device, comprising:
a laser;
a refracting unit to refract light emitted from the laser;
a refracting unit control procedure to send a signal to the refracting unit to control refraction degree and timing;
an OPC to hold a charge for alteration by the laser; and
wherein the refracting unit comprises a photorefractive crystal.

16. The imaging device of claim 15, additionally comprising:
a stationary reflecting mirror to reflect the refracted light onto the OPC.

17. The imaging device of claim 15, additionally comprising:
a feedback system to alter the signal sent to the refracting unit in response to the refracted light.

18. The imaging device of claim 15, wherein the refracting unit control procedure produces the signal according to pulse data associated with an image.

19. An imaging device, comprising:
a laser;
a refracting unit to refract light emitted from the laser;
a refracting unit control procedure to send a signal to the refracting unit to control refraction degree and timing;
an OPC to hold a charge for alteration by the laser; and
wherein the refracting unit comprises a lens moved by a servo system.

20. The imaging device of claim 19, additionally comprising:
a stationary reflecting mirror to reflect the refracted light onto the OPC.

21. The imaging device of claim 19, additionally comprising:
a feedback system to alter the signal sent to the refracting unit in response to the refracted light.

22. The imaging device of claim 19, wherein the refracting unit control procedure produces the signal according to pulse data associated with an image.

23. A processor-readable medium comprising processor-executable instructions for:
generating a first signal to control a light refracting device;
generating a second signal to turn on and off a laser for emission of light directed through the light refracting device; and
using pulse data to produce the first and second signals, wherein the pulse data represents an image which results after refracted light strikes an OPC.

24. A processor-readable medium as recited in claim 23, wherein processor-executable instructions for generating the first signal are compatible with a photorefractive crystal.

25. A processor-readable medium as recited in claim 23, wherein processor-executable instructions for generating the first signal are compatible with a servo system controlling a lens.

26. A processor-readable medium as recited in claim 23, wherein processor-executable instructions for generating the first signal are compatible with use of a curved stationary mirror to reflect the refracted light onto the OPC.

27. A processor-readable medium as recited in claim 23, comprising further instructions for:
altering the first signal sent to the light refractive device as a result of feedback based on the refracted light.

28. A processor-readable medium comprising processor-executable instructions for:
generating, from pulse data input, a first signal to control a laser and a second signal to control a light refracting device, wherein light emitted from the laser is refracted by the light refracting device; and
coordinating the first and second signals to produce an image by reflecting the refracted light off a stationary mirror having a curved surface and onto an OPC.

29. A processor-readable medium as recited in claim 28, additionally comprising further instructions for:
altering the second signal sent to the light refractive device as a result of feedback based on the refracted light.

30. A processor-readable medium as recited in claim 28, wherein instructions for generating the second signal includes instructions for controlling a device selected from a group comprising:
a photorefractive crystal; and
a lens controlled by a servo system.

31. A method for configuring an OPC to output an image, comprising:
generating a first signal to control a laser and a second signal to control a laser refracting unit;
refracting light emitted from the laser by passing it through the laser refracting unit;
altering a surface charge of the OPC with the refracted light; and
wherein the refracted light passes to the OPC without reflection.

32. The method of claim 31, additionally comprising:
reflecting the refracted light off a curved surface of a stationary mirror.

33. A method for configuring an OPC to output an image, comprising:
generating a first signal to control a laser and a second signal to control a laser refracting unit;

refracting light emitted from the laser by passing it through the laser refracting unit;

altering a surface charge of the OPC with the refracted light; and wherein the second signal is configured to control a photorefractive crystal.

34. The method of claim 33, additionally comprising:

reflecting the refracted light off a mirror and onto the OPC.

35. The method of claim 33, additionally comprising:

reflecting the refracted light off a mirror and onto the OPC.

36. A method for configuring an OPC to output an image, comprising:

generating a first signal to control a laser and a second signal to control a laser refracting unit;

refracting light emitted from the laser by passing it through the laser refracting unit;

altering a surface charge of the OPC with the refracted light; and wherein the second signal is configured to control movement of a lens.

37. The method of claim 36, additionally comprising:

reflecting the refracted light off a curved surface of a stationary mirror.

38. The method of claim 36, additionally comprising:

reflecting the refracted light off a curved surface of a stationary mirror.

39. A method for configuring an OPC to output an image, comprising:

generating a first signal to control a laser and a second signal to control a laser refracting unit;

refracting light emitted from the laser by passing it through the laser refracting unit;

altering a surface charge of the OPC with the refracted light; and using feedback as an additional input to generate the second signal.

40. The method of claim 39, additionally comprising:

reflecting the refracted light off a mirror and onto the OPC.

41. The method of claim 39, additionally comprising:

reflecting the refracted light off a curved surface of a stationary mirror.

42. An imaging device, comprising:

means for generating a first signal to control a laser and a second signal to control a light refracting device, wherein light emitted from the laser is refracted by the light refracting device; and means for charging an OPC according to the refracted light emitted from the laser, means for configuring an OPC for production of an image by reflecting the refracted light off a stationary mirror and onto the OPC.

43. The imaging device of claim 42, additionally comprising:

means for altering the second signal sent to the light refractive device as a result of feedback based on the refracted light.

44. The imaging device of claim 42, additionally comprising:

means for reflecting the refracted light onto the OPC.

45. The imaging device of claim 42, wherein the means for generating the first and second signals receives laser pulse data as an input.

46. The imaging device of claim 42, wherein the means for generating the second signal controls a photorefractive crystal.

47. The imaging device of claim 42, wherein the means for generating the second signal controls a servo system moving a lens.

* * * * *